Patented Feb. 20, 1934

1,948,106

UNITED STATES PATENT OFFICE 1,948,106

PROCESS FOR THE PREPARATION OF METAL CYANAMIDS OR MIXTURES CONTAINING THE SAME

Hans Heinrich Franck, Berlin, Germany

No Drawing. Application October 19, 1927, Serial No. 227,352, and in Germany October 23, 1926

13 Claims. (Cl. 23—78)

Applications have been filed in Germany October 23, 1926, October 27, 1926, and December 2, 1926, and in Great Britain September 30, 1927.

The idea of preparing a high grade calcium cyanamid for technical uses from calcium carbonate by reversion of the reaction whereby ammonia is produced from cyanamid according to the equation:

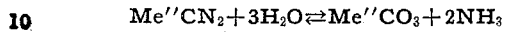
$$Me''CN_2 + 3H_2O \rightleftharpoons Me''CO_3 + 2NH_3$$

has hitherto appeared impractical.

The description in the literature is only general and no example is given for this most important technical application. Experiments indeed have shown that temperatures appreciably below the dissociation temperature of calcium carbonate (for example 250° C. below) are too low for useful reaction velocity and that only a nominal yield can be obtained. From the equation, it will be seen that 3 mols. of water react with 1 mol. of CaCN₂, so that on the whole it seems that the hydrolysis equilibrium is scarcely likely to be reversed; the high yield of 98 to 99% in the technical preparation of ammonia from lime nitrogen is in agreement with this supposition.

A thorough investigation has now demonstrated the possibility of preparing high grade calcium cyanamid (lime nitrogen) or magnesium cyanamid from the corresponding carbonates by choosing suitable temperature conditions.

The more one approaches the dissociation temperature of the carbonate, the greater is the rate of formation of cyanamid. It has even been found in the case of a carbonate whose dissociation temperature range lies so relatively low as that of magnesium carbonate, that good yields of cyanamid can be obtained at 50° C. and more above the dissociation temperature. In general, this temperature range can be so formulated that ammonia gas is passed over the corresponding carbonates below, at, or not much above their dissociation temperatures for the production of calcium or magnesium cyanamid. In this way, at a temperature of 700 to 850° C., an 80 to 95% calcium cyanamid is obtained at a rate suitable for technical purposes, with a 10 to 20% yield of the ammonia in the combined form and a total yield of 95 to 100% nitrogen combined and recovered.

As raw material technical or natural calcium carbonate such as dried carbonate sludge, limestone, chalk, marble, etc., may be used.

The corresponding temperature for magnesium carbonates, such as magnesite is 500 to 600° C., and over; for mixed carbonates, for example dolomite, it is 550 to 700° C.

Another important condition is the prevention of any possible decomposition of ammonia. Since at the temperatures in question, the equilibrium inclines strongly towards the decomposition side, care must be taken that all substances which would tend to accelerate it catalytically are excluded as far as possible. Thus, the presence of metals such as iron, nickel or their compounds in the apparatus is to be avoided and the reaction is best carried out in vessels (retorts, tubes) made of ceramic material, particularly quartz.

The reaction velocity is influenced in the direction of cyanamid formation by the presence of certain fluxes. By this means, the velocity is increased by 25% and more. Among these fluxes may be mentioned calcium oxide, sodium carbonate and calcium fluoride. While these materials which are added to increase the reaction velocity have been termed "fluxes", it is to be understood that their purpose is not to assist in fusion of the charge since the charge does not undergo a true fusion process.

The high grade cyanamid obtained is suitable besides its agricultural use, especially for chemical reactions such as cyanide melts, HCN formation, etc.

In the further development of the process, it has been found that particularly good results are obtained by maintaining a definite relation between the velocity of the gas stream and the volume occupied by the charge. It is obvious that the dissociation velocity of a carbonate is not the same under all conditions and for all carbonates of different origins. (c. f. L. Andrussow, Z. f. physik. Ch. (1925) 115, p., 278). In particular, grain size, impurities, crystalline form, etc. play an important role. While the CO₂ equilibrium in the gas phase is the same at a given temperature for all calcium carbonates, it is reached at a different rate in the case of different materials. It is clear that in the fixation of ammonia as cyanamid by the carbonate, the carbon atom of the carbonate determines the extent of the nitrification. A rapid dissociation of the carbonate gives a low efficiency of nitrogen fixation. On the other hand, the temperature velocity rule holds.

It is therefore of decisive importance for the obtaining of a high yield of cyanamid that it has been ascertained by experiments that the above mentioned difficulties are overcome for a definite relation between velocity and weight of carbonate at ordinary or increased pressure. This relationship is generally referred to as "space velocity" and may be defined as the ratio of volumes of gas per hour passing over one volume of charge. This gas velocity is by 500 volumes per hour and volume of the charge. Its upper limit is less clearly defined; however, velocities of 5000 can not be exceeded to any advantage, since above this value, the fixation of the ammonia current by the solid phase may become uneconomical.

As an example, the following figures may be compared:

| Temperature | NH₃ liter/hr. | %N as cyanamid |
|---|---|---|
| 700° C. | 500 | 6 time and weight equal. |
| 700° C. | 1,000 | 10.7. |

It is further found, that a certain temperature gas velocity relation exists which can be seen even from the above table. It was, for example, found that by increasing the velocity of the ammonia current the reaction temperature may be lowered by 50° C. or even 100° C. and more. This is of important technical import since every diminution of temperature saves heat and wear of the apparatus; on the other hand, naturally, a high gas velocity should have the effect of a vacuum on the dissociation with increasing temperature.

The following examples may be given:

| Temperature | NH₃ liter/hr. | %N as cyanamid |
|---|---|---|
| 800° C. | 500 | 7.5 time and weight same. |
| 700° C. | 500 | 6.0. |
| 750° C. | 1,000 | 13.2 different carbonate. |
| 700° C. | 1,000 | 15.0. |

These figures show how a rise in temperature increases the reaction velocity at the same gas velocity, and how, on the other hand, increasing the gas velocity enables the temperature to be reduced; also the difference due to the raw material used.

On the further investigation of the process the surprising fact has been established that the cyanamids of calcium, magnesium and zinc, but not of the alkali metals, can be readily prepared by treating the carbonates of these metals under pressure with dry ammonia gas. This was unexpected, since the equation for the endothermic reaction:

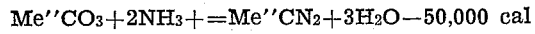

shows that the number of molecules increases from left to right; therefore according to the principle of minimum force, increase of pressure should cause the reaction to go towards the left, as for example in the pressure hydrolysis of lime nitrogen to ammonia.

The pressure of the system Me″CO₃+2NH₃ need not be produced exclusively by ammonia; mixtures of ammonia with inert gases such as hydrogen or nitrogen or both may be employed. A suitable temperature range is in general such that the dissociation pressure in the uncompressed system is one atmosphere, or slightly less or greater than one atmosphere. The magnitude of the pressure used is regulated in general according to the temperature in the sense that at temperatures at which the dissociation pressure of the carbonate is reached or exceeded the applied pressure must be higher. The position of the ammonia dissociation equilibrium is also a determining factor in the choice of a pressure. In general, pressures of 3 to 10 atmospheres have been found to be sufficient for favorable technical results. Higher pressures, however, can be employed.

High grade metal cyanamids or mixtures containing occasionally some carbonate or oxide of the metal used as starting material are obtained in this way with a yield of fixed or recovered ammonia-nitrogen of 98 to 100%. For the maintenance of these yields it is found advantageous to exclude from the heated part of the apparatus (retorts, tubes) such metals as iron or nickel which promote the decomposition of ammonia.

The carrying out of the process is illustrated by the following examples:

1. 1 kg. calcium carbonate (e. g. dry carbonate sludge from ammonium sulfate manufacture or pulverized marble) is treated in an electric pressure tube oven at 750° C. and 5 to 8 atm. pressure with a current of ammonia. A 95% calcium cyanamid containing some carbonate and free calcium oxide is obtained.

2. 50 g. magnesium carbonate pressed into tablets is treated with a current of ammonia for 4 hours at 550° C. and 10 atm. pressure. Magnesium cyanamid containing 40.9% nitrogen is obtained.

3. 50 g. zinc carbonate (natural mineral) are treated with ammonia gas at 400° C. under 8 to 10 atm. pressure. After 3 hours 50% of the carbonate has been converted into cyanamid.

Since the formation of the cyanamid salts is in every case accompanied with the splitting off of water, the reaction can be accelerated by including in the system behind the reaction vessel or tube, a vessel in which the water will condense, since the condensation of water vapor from the gaseous phase will have a favorable effect on the equilibrium.

The metallic cyanamids so obtained are pure white substances which can be used industrially as such, or converted into other chemical substances.

What I claim is:

1. A process for the preparation of material containing calcium cyanamid which comprises reacting with ammonia gas upon a calcium carbonate, at a temperature substantially at the dissociation temperature of the carbonate at ordinary pressure.

2. A process for the preparation of material containing a cyanamid of a metal of the second group of the periodic system which comprises reacting with dry ammonia gas upon a corresponding carbonate, the reaction being carried out under pressure of 3 to 10 atmospheres and at a temperature corresponding substantially to the dissociation temperature of the carbonate at ordinary pressure.

3. The process of claim 2 in which the pressure is partly produced by addition to the ammonia of gases inert to the reaction.

4. The process of claim 2 in which the water formed during the reaction is removed from the zone of reaction.

5. The process for the preparation of material containing calcium cyanamid which comprises reacting with ammonia gas upon a calcium carbonate, at a reaction temperature above 600° C. but not above the dissociation temperature of the carbonate at ordinary pressure.

6. The process of claim 5 in which the space velocity ratio is between 500:1 and 5000:1.

7. A process for the preparation of material containing calcium cyanimid which comprises reacting upon a calcium carbonate with ammonia gas at a temperature between 600° and 850° C.

8. The process of preparing a cyanamid which comprises reacting with ammonia gas upon calcium carbonate at a temperature between 700° and 850° C.

9. The process of preparing a cyanamid which comprises reacting with ammonia gas upon a mass containing calcium carbonate, at a temperature between 700° and 850° C. and at a pressure from 3 to 10 atmospheres, the space velocity being between 500 and 5000.

10. A process for the preparation of material containing a cyanamid of a metal of the second group of the periodic system which comprises reacting with ammonia gas upon a corresponding carbonate, at a reaction temperature above 500° C., but not substantially above the dissociation temperature of the carbonate, and at pressures above atmospheric, but not substantially above ten atmospheres.

11. The process of claim 10 in which the ammonia has mixed therewith a gas inert to the reaction.

12. Process for manufacturing calcium cyanamid, consisting in causing gases containing ammonia to react with calcium carbonate with a space velocity of 500:1 to 5000:1 at temperatures of 650–850° C.

13. Process for manufacturing calcium cyanamid, consisting in causing ammonia to react with calcium carbonate with a space velocity of 500:1 to 5000:1 at temperatures of 650–850° C.

HANS HEINRICH FRANCK.